(12) United States Patent
Yoo et al.

(10) Patent No.: US 10,465,771 B2
(45) Date of Patent: Nov. 5, 2019

(54) PLANETARY GEAR TRAIN OF AUTOMATIC TRANSMISSION FOR VEHICLES

(71) Applicants: HYUNDAI MOTOR COMPANY, Seoul (KR); KIA Motors Corporation, Seoul (KR)

(72) Inventors: Ilhan Yoo, Seongnam-si (KR); Seong Wook Hwang, Gunpo-si (KR); Seongwook Ji, Gunpo-si (KR); Juhyeon Park, Suwon-si (KR); Hyun Sik Kwon, Seoul (KR); Jae Chang Kook, Hwaseong-si (KR); Ki Tae Kim, Incheon (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 25 days.

(21) Appl. No.: 15/819,772

(22) Filed: Nov. 21, 2017

(65) Prior Publication Data
US 2019/0085944 A1    Mar. 21, 2019

(30) Foreign Application Priority Data
Sep. 20, 2017   (KR) .................. 10-2017-0121438

(51) Int. Cl.
*F16H 3/66* (2006.01)
*F16H 3/44* (2006.01)

(52) U.S. Cl.
CPC .............. *F16H 3/66* (2013.01); *F16H 3/666* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC combination set(s) only.
See application file for complete search history.

(56) References Cited

U.S. PATENT DOCUMENTS

| 3,971,268 A | * | 7/1976 | Murakami | ................ F16H 3/66 475/276 |
| 4,046,031 A | * | 9/1977 | Ott | ............................ F16H 3/66 475/280 |
| 9,175,748 B2 | | 11/2015 | Goleski et al. | |

(Continued)

*Primary Examiner* — Timothy Hannon
(74) *Attorney, Agent, or Firm* — McDonnell Boehnen Hulbert & Berghoff LLP

(57) ABSTRACT

A planetary gear train of an automatic transmission includes an input shaft for receiving an engine torque; an output shaft for outputting a torque; a first planetary gear set having first, second, and third rotational elements; a second planetary gear set having fourth, fifth, and sixth rotational elements; a third planetary gear set having seventh, eighth, and ninth rotational elements; and a fourth planetary gear set having tenth, eleventh, and twelfth rotational elements. The gear train further includes a first shaft and a second shaft each selectively connected with the input shaft; a third shaft fixedly connected with the output shaft; a fourth shaft fixedly connected with the first, sixth and eighth elements; a fifth shaft fixedly connected with the ninth and tenth elements; and a plurality of shafts, each selectively connected to the transmission housing and fixedly connected to one of the rotational elements of the planetary gear sets.

9 Claims, 2 Drawing Sheets

(56) References Cited

U.S. PATENT DOCUMENTS

2015/0094185 A1* 4/2015 Beck .................. F16H 3/66
 475/275
2016/0040756 A1* 2/2016 Beck .................. F16H 3/66
 475/275
2016/0047442 A1* 2/2016 Beck .................. F16H 3/66
 475/275
2016/0053869 A1* 2/2016 Beck .................. F16H 3/66
 475/275

* cited by examiner

FIG. 2

| Shift-stage | Control element | | | | | | Gear ratio |
|---|---|---|---|---|---|---|---|
| | C1 | C2 | C3 | C4 | B1 | B2 | |
| D1 |  | ● | ● |  | ● |  | 5.416 |
| D2 |  | ● |  |  | ● | ● | 4.112 |
| D3 |  | ● | ● |  |  | ● | 3.004 |
| D4 |  | ● |  | ● |  | ● | 1.792 |
| D5 | ● | ● |  |  |  | ● | 1.358 |
| D6 | ● |  |  | ● |  | ● | 1.234 |
| D7 | ● | ● | ● |  |  |  | 1.000 |
| D8 | ● |  | ● |  |  | ● | 0.886 |
| D9 | ● |  | ● |  | ● |  | 0.750 |
| D10 | ● |  |  |  | ● | ● | 0.569 |
| REV |  | ● |  | ● | ● |  | -4.499 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0121438 filed in the Korean Intellectual Property Office on Sep. 20, 2017, the entire contents of which are incorporated herein by reference.

BACKGROUND OF THE DISCLOSURE (a) Field of the Disclosure

The present disclosure relates to an automatic transmission for a vehicle. More particularly, the present disclosure relates to a planetary gear train of an automatic transmission for a vehicle having advantages of, by minimal complexity, realizing ten forward speeds, thereby improving power delivery performance and fuel consumption due to multi-stages, and improving driving stability of a vehicle by utilizing a low rotation speed of an engine.

(b) Description of the Related Art

Generally, in the automatic transmission field, achieving more shift stages is a technology for maximizing fuel consumption and driving efficiency and has been researched. Recent increases in oil prices are triggering hard competition in enhancing fuel consumption of a vehicle.

In this sense, research on an engine has been undertaken to achieve weight reduction and to enhance fuel consumption by so-called downsizing. Research on an automatic transmission has also been performed to simultaneously provide better drivability and fuel consumption by achieving more shift stages.

In order to achieve more shift stages for an automatic transmission, the number of parts, particularly the number of planetary gear sets is typically increased and installability, production cost, weight, and power flow efficiency according to the total length of transmission is increased.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is continuously required.

However, the majority of general automatic transmissions having more than eight speeds include three to four planetary gear sets and five to seven control elements (friction elements), in this case, total length is increased, which has drawbacks of deteriorating installability.

As a result, a plural row structure which accommodates planetary gear sets has been adopted, or a dog clutch is applied in place of wet control elements. However, in this case, applicable structure is restricted and shift feel is deteriorated by applying the dog clutch.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a planetary gear train of an automatic transmission for a vehicle having advantages of obtaining shift-stages of the ten forward speeds by minimal number of parts, improving power delivery performance and fuel consumption by multi-stages of an automatic transmission, and improving driving stability of a vehicle by utilizing a low rotation speed of an engine.

A planetary gear train according to an exemplary embodiment of the present disclosure includes an input shaft for receiving an engine torque; an output shaft for outputting a torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft fixedly connected with the sixth rotational element and selectively connected with the input shaft; a second shaft fixedly connected with the seventh rotational element and selectively connected with the input shaft; a third shaft fixedly connected with the eleventh rotational element and fixedly connected with the output shaft; a fourth shaft fixedly connected with the first rotational element, the eighth rotational element, and the twelfth rotational element; a fifth shaft fixedly connected with the third rotational element, the fourth rotational element, and the ninth rotational element; and a plurality of shafts, each of which is selectively connected to the transmission housing and fixedly connected to a rotation element of the first, second, and fourth planetary gear sets that is not fixedly connected with any of the first to fifth shafts.

Here, the plurality of shafts comprise: a sixth shaft fixedly connected with the second rotational element and the fifth rotational element, and selectively connected with the transmission housing; and a seventh shaft fixedly connected with the tenth rotational element, and selectively connected with the transmission housing, wherein the input shaft is selectively connected with the first shaft, the input shaft is selectively connected with the second shaft, the fifth shaft is selectively connected with the seventh shaft, and the third shaft is selectively connected with the fifth shaft.

The planetary gear train further includes four clutches selectively connecting two shafts from the first to the seventh shaft; and two brakes selectively connecting the sixth shaft and the seventh shaft to the transmission housing, respectively.

At this time, the four clutches further comprise a first clutch disposed between the input shaft and the first shaft; a second clutch disposed between the input shaft and the second shaft; a third clutch disposed between the fifth shaft and the seventh shaft; and a fourth clutch disposed between the third shaft and the fifth shaft, and the two brakes further comprise a first brake disposed between the transmission housing and the sixth shaft; and a second brake disposed between the seventh shaft and the transmission housing.

Further, the first planetary gear set is a single pinion planetary gear set, and the first, second, and third rotational elements are, respectively, a first sun gear, a first planetary carrier, and a first ring gear; the second planetary gear set is a single pinion planetary gear set, and the fourth, fifth, and sixth rotational elements are, respectively, a second sun gear, a second planetary carrier, and a second ring gear; the third planetary gear set is a single pinion planetary gear set, and the seventh, eighth, and ninth rotational elements are, respectively, a third sun gear, a third planetary carrier, and a third ring gear; and the fourth planetary gear set is a single pinion planetary gear set, and the tenth, eleventh, and twelfth rotational elements are, respectively, a fourth sun gear, a fourth planetary carrier, and a fourth ring gear.

A planetary gear train of an automatic transmission for a vehicle according to an exemplary embodiment of the present disclosure, shift-stages of ten forward speeds and one reverse speed may be realized by combination of four planetary gear sets of simple planetary gear sets and six control elements.

Further, a planetary gear train according to an exemplary embodiment of the present disclosure may realize shift stages appropriate for the rotational speed of an engine due to multi-stages of an automatic transmission and improve driving stability of a vehicle by utilizing a low rotational speed of an engine.

Further, a planetary gear train according to an exemplary embodiment of the present disclosure maximize engine driving efficiency by multi-stages of an automatic transmission, and may improve power delivery performance and fuel consumption.

Further, effects that can be obtained or expected from exemplary embodiments of the present disclosure are directly or suggestively described in the following detailed description. That is, various effects expected from exemplary embodiments of the present disclosure will be described in the following detailed description.

BRIEF DESCRIPTION OF THE DRAWINGS

FIG. 2 is an operational chart for respective control elements at respective shift stages in a planetary gear train according to an exemplary embodiment of the present disclosure.

DETAILED DESCRIPTION OF THE EMBODIMENTS

Figure 1:
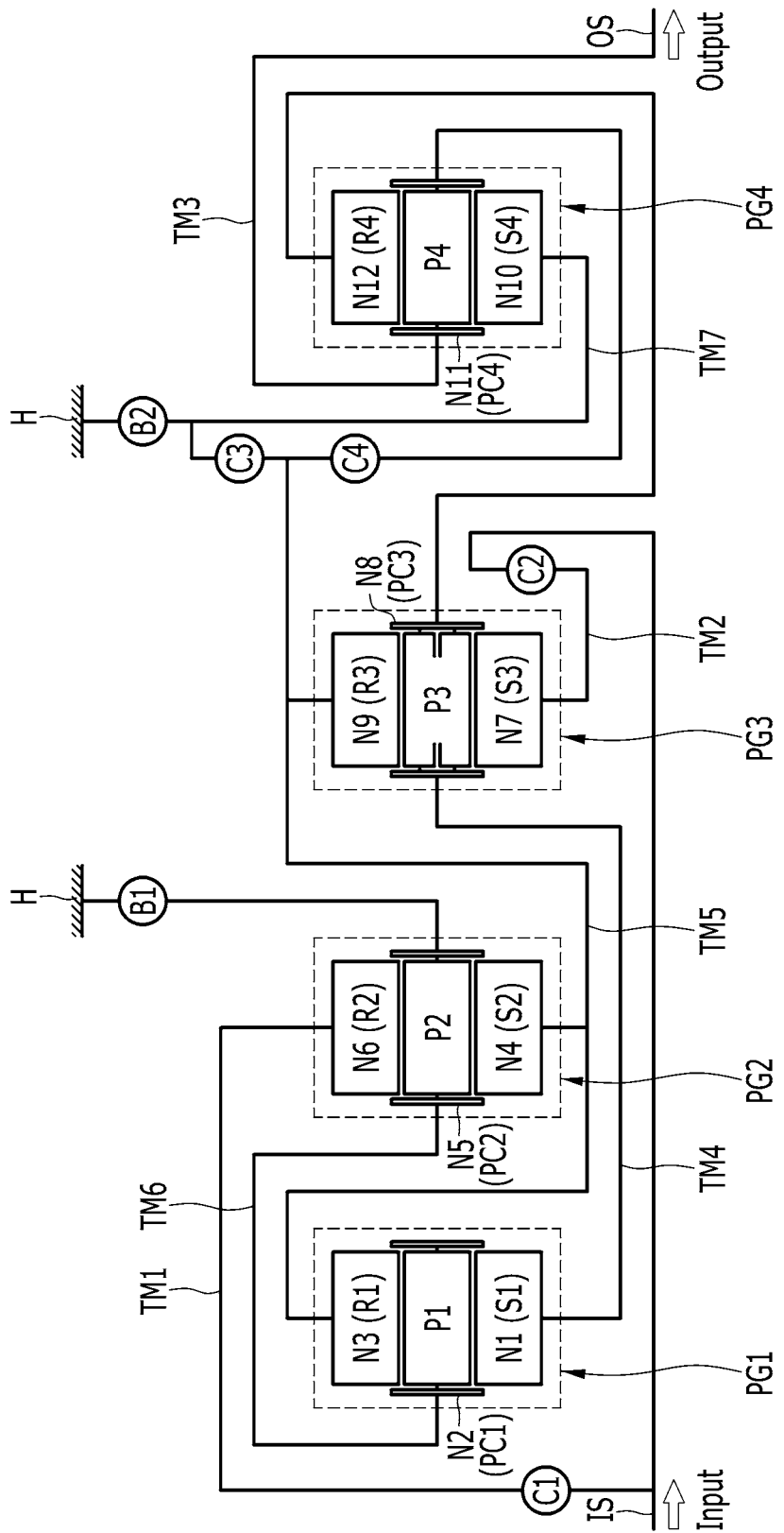
FIG. 1 is a schematic diagram of a planetary gear train according to an exemplary embodiment of the present disclosure.

Hereinafter, an exemplary embodiment of the present disclosure will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present disclosure.

Referring to FIG. 1, a planetary gear train according to an exemplary embodiment of the present disclosure includes first, second, third, and fourth planetary gear sets PG1, PG2, PG3, and PG4 arranged on a same axis, an input shaft IS, an output shaft OS, seven shafts TM1 to TM7 connected with rotational elements of the first, second, third, and fourth planetary gear sets PG1, PG2, PG3, and PG4, four clutches C1 to C4, two brakes B1 and B2 as control elements, and a transmission housing H.

Torque input from the input shaft IS is shifted by cooperative operation of the first, second, third, and fourth planetary gear sets PG1, PG2, PG3, and PG4, and then output through the output shaft OS.

In an exemplary embodiment of the present disclosure, the planetary gear sets are arranged in the order of first, second, third and fourth planetary gear sets PG1, PG2, PG3 and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus which is not illustrated.

The first planetary gear set PG1 is a single pinion planetary gear set, and includes a first sun gear S1, a first planet carrier PC1 that supports a plurality of first pinion gear P1 externally engaged with the first sun gear S1 so that the first pinion gear P1 may rotate and revolve, and a first ring gear R1 internally engaged and torque-connected with a plurality of the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a plurality of second pinion gear P2 externally engaged with the second sun gear S2 so that the second pinion gear P2 may rotate and revolve, and a second ring gear R2 internally engaged and torque-connected with a plurality of the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a plurality of third pinion gear P3 externally engaged with the third sun gear S3 so that the third pinion gear P3 may rotate and revolve, and a third ring gear R3 internally engaged and torque-connected with a plurality of the third pinion P3. The third sun gear S3 acts as a seventh rotational element N7, the third planet carrier PC3 acts as a eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 is fixedly connected with the eighth rotational element N8 and the twelfth rotational element N12, the second rotational element N2 is fixedly connected with the fifth rotational element N5, and the third rotational element N3 is fixedly connected with the fourth rotational element N4 and the ninth rotational element N9 by seven shafts TM1 to TM7.

The seven shafts TM1 to TM7 are arranged as follows.

The first shaft TM1 is fixedly connected with the sixth rotational element N6 (the second ring gear R2) and selectively connected with the input shaft IS, thereby acting as a selective input element.

The second shaft TM2 is fixedly connected with the seventh rotational element N7 (the third sun gear S3) and selectively connected with the input shaft IS, thereby acting as a selective input element.

The third shaft TM3 is fixedly connected with the eleventh rotational element N11 (the fourth planetary carrier PC4) and fixedly connected with the output shaft OS, thereby always acting as an output element.

The fourth shaft TM4 is fixedly connected with the first rotational element N1 (the first sun gear S1), the eighth rotational element N8 (the third planetary carrier PC3), and the twelfth rotational element N12 (the fourth ring gear R4).

The fifth shaft TM5 is fixedly connected with the third rotational element N3 (the first ring gear R1), the fourth rotational element N4 (the second sun gear S2), and the ninth rotational element N9 (the third ring gear R3).

The sixth shaft TM6 is fixedly connected with the second rotational element N2 (the first planetary carrier PC1) and the fifth rotational element N5 (the second planetary carrier PC2), and selectively connected with the transmission housing H, thereby acting as a selective fixed element.

The seventh shaft TM7 is fixedly connected with the tenth rotational element N10 (the fourth sun gear S4), and selectively connected with the transmission housing H, thereby acting as a selective fixed element.

Each of the seven shafts TM1 to TM7 may be a rotational member that delivers torque and rotates with a rotational element which fixedly or selectively interconnects a plurality of the rotational elements of the rotational elements of the planetary gear sets PG1, PG2, PG3, and PG4. Each of the seven shafts TM1 to TM7 may be a rotational member selectively connecting the rotational element with the transmission housing H, or a fixed member directly connecting and fixing the rotational element with the transmission housing H.

In the disclosure, in the above description, the term "fixedly connected" or similar term means that a plurality of rotational elements including the input and output shafts, which are connected through the corresponding shafts, and the corresponding shaft are connected so as to rotate without any difference in the number of revolutions. That is, a plurality of fixedly connected rotational elements and corresponding shafts rotate in the same rotational direction and number of revolutions.

In addition, in the above description, the term "selectively connected" or similar terms means that a plurality of shafts, including input and output shafts, are connected to each other so as to be rotatable in the same rotational direction and number of revolutions through engagement elements, or the corresponding shaft is fixedly connected to the transmission housing via the engagement element.

That is, when the engagement element operates to selectively connect a plurality of the shafts, the plurality of the shafts rotate in the same rotational direction and number of revolutions. Conversely, when the engagement element is released, the connection of the plurality of the shafts is released.

Further, when the engagement element operates to selectively connect the corresponding shaft and the transmission housing, the corresponding shaft is fixedly connected to the transmission housing. Conversely, when the engagement element is released, the corresponding shaft is in a rotatable state.

Here, the first shaft TM1 and the second shaft TM2 are selectively connected with the input shaft IS, and the fifth shaft TM5 is selectively connected with the third shaft TM3 and the seventh shaft TM7.

Further, the sixth shaft TM6 and the seventh shaft TM7 are selectively connected with the transmission housing H to act as a selective fixed element.

The seven shafts TM1 to TM7, the input shaft IS, and the output shaft OS may be selectively interconnected with one another by control elements of four clutches C1 to C4.

The seven shafts TM1 to TM7 may be selectively connected with the transmission housing H, by control elements of two brakes B1 and B2.

The four clutches C1 to C4 and the two brakes B1 and B2 are arranged as follows.

The first clutch C1 is arranged between the input shaft IS and the first shaft TM1, and selectively connects the input shaft IS and the first shaft TM1, thereby controlling power delivery therebetween.

The second clutch C2 is arranged between input shaft IS and the second shaft TM2, and selectively connects the input shaft IS and the second shaft TM2, thereby controlling power delivery therebetween.

The third clutch C3 is arranged between the fifth shaft TM5 and the seventh shaft TM7, and selectively connects the fifth shaft TM5 and the seventh shaft TM7, thereby controlling power delivery therebetween.

The fourth clutch C4 is arranged between the third shaft TM3 and the fifth shaft TM5, and selectively connects the third shaft TM3 and the fifth shaft TM5, thereby controlling power delivery therebetween.

The first brake B1 is arranged between the sixth shaft TM6 and the transmission housing H, and selectively connects the sixth shaft TM6 to the transmission housing H.

The second brake B2 is arranged between the seventh shaft TM7 and the transmission housing H, and selectively connects the seventh shaft TM7 to the transmission housing H.

The engagement elements of the first, second, third, and fourth clutches C1, C2, C3, and C4 and the first and second brakes B1 and B2 may be realized as multi-plate hydraulic pressure friction devices that are frictionally engaged by hydraulic pressure. However, it should not be understood to be limited thereto, since various other configurations that are electrically controllable may be available.

FIG. 2 is an operational chart for respective control elements at respective shift stages in a planetary gear train according to an exemplary embodiment of the present disclosure.

Referring to FIG. 2, a planetary gear train according to an exemplary embodiment of the present disclosure realizes ten forward speeds and at least one reverse speed by operating three engagements among the first, second, and third clutches C1, C2, C3 and C4 and first and second brake B1 and B2.

In the forward first speed shift-stage D1, the second and third clutches C2 and C3 and the first brake B1 are simultaneously operated.

As a result, the second shaft TM2 is fixedly connected with the input shaft IS by the operation of the second clutch C2, and the fifth shaft TM5 is fixedly connected with the seventh shaft TM7 by the operation of the third clutch C3. In this state, torque of the Input shaft IS is input to the second shaft TM2.

In addition, the sixth shaft TM6 acts as a fixed element by the operation of the first brake B1, thereby realizing the forward first speed and outputting a shifted torque to the output shaft OS connected with the third shaft TM3.

In the forward second speed shift-stage D2, the second clutch C2 and the first and second brakes B1 and B2 are simultaneously operated.

As a result, the second shaft TM2 is fixedly connected with the input shaft IS by the operation of the second clutch C2. In this state, torque of the Input shaft IS is input to the second shaft TM2.

In addition, the sixth shaft TM6 and the seventh shaft TM7 act as fixed elements by the operation of the first and second brakes B1 and B2, thereby realizing the forward second speed and outputting a shifted torque to the output shaft OS connected with the third shaft TM3.

In the forward third speed shift-stage D3, the second and third clutches C2 and C3 and the second brake B2 are simultaneously operated.

As a result, the second shaft TM2 is fixedly connected with the input shaft IS by the operation of the second clutch C2, and the fifth shaft TM5 is fixedly connected with the seventh shaft TM7 by the operation of the third clutch C3. In this state, torque of the Input shaft IS is input to the second shaft TM2.

In addition, the seventh shaft TM7 acts as a fixed element by the operation of the second brake B2, thereby realizing the forward third speed and outputting a shifted torque to the output shaft OS connected with the third shaft TM3.

In the forward fourth speed shift-stage D4, the second and fourth clutches C2 and C4 and the second brake B2 are simultaneously operated.

As a result, the second shaft TM2 is fixedly connected with the input shaft IS by the operation of the second clutch C2, and the third shaft TM3 is fixedly connected with the fifth shaft TM5 by the operation of the fourth clutch C4. In this state, torque of the Input shaft IS is input to the second shaft TM2.

In addition, the seventh shaft TM7 acts as a fixed element by the operation of the second brake B2, thereby realizing the forward fourth speed and outputting a shifted torque to the output shaft OS connected with the third shaft TM3.

In the forward fifth speed shift-stage D5, the first and second clutches C1 and C2 and the second brake B2 are simultaneously operated.

As a result, the first shaft TM1 and the second shaft TM2 are fixedly connected with the input shaft IS by the operation of the first clutch C1 and the second clutch C2, respectively. In this state, torque of the Input shaft IS is input to the first and second shafts TM1 and TM2.

In addition, the seventh shaft TM7 acts as a fixed element by the operation of the second brake B2, thereby realizing the forward fifth speed and outputting a shifted torque to the output shaft OS connected with the third shaft TM3.

In the forward sixth speed shift-stage D6, the first and fourth clutches C1 and C4 and the second brake B2 are simultaneously operated.

As a result, the first shaft TM1 is fixedly connected with the input shaft IS by the operation of the first clutch C1, and the third shaft TM3 is fixedly connected with the fifth shaft TM5 by the operation of the fourth clutch C4. In this state, torque of the Input shaft IS is input to the first shaft TM1.

In addition, the seventh shaft TM7 acts as a fixed element by the operation of the second brake B2, thereby realizing the forward sixth speed and outputting a shifted torque to the output shaft OS connected with the third shaft TM3.

In the forward seventh speed shift-stage D7, the first, second, and third clutches C1, C2, and C3 are simultaneously operated.

As a result, the first shaft TM1 and the second shaft TM2 are fixedly connected with the input shaft IS by the operation of the first clutch C1 and the second clutch C2, respectively, and the fifth shaft TM5 is fixedly connected with the seventh shaft TM7 by the operation of the third clutch C3.

Then, the first, second, third, and fourth planetary gear sets PG1, PG2, PG3, and PG4 integrally rotate, and the torque received at the first shaft TM1 and the second shaft TM2 is outputted as inputted, thereby realizing the forward seventh speed and outputting a shifted torque through the output shaft OS connected with the third shaft TM3.

In the forward first speed shift-stage D8, the first and third clutches C1 and C3 and the second brake B2 are simultaneously operated.

As a result, the first shaft TM1 is fixedly connected with the input shaft IS by the operation of the first clutch C1, and the fifth shaft TM5 is fixedly connected with the seventh shaft TM7 by the operation of the third clutch C3. In this state, torque of the Input shaft IS is input to the second shaft TM2.

In addition, the seventh shaft TM7 acts as a fixed element by the operation of the second brake B2, thereby realizing the forward eighth speed and outputting a shifted torque to the output shaft OS connected with the third shaft TM3.

In the forward ninth speed shift-stage D9, the first and third clutches C1 and C3 and the first brake B1 are simultaneously operated.

As a result, the first shaft TM1 is fixedly connected with the input shaft IS by the operation of the first clutch C1, and the fourth shaft TM4 is fixedly connected with the seventh shaft TM7 by the operation of the third clutch C3. In this state, torque of the Input shaft IS is input to the second shaft TM2.

In addition, the sixth shaft TM6 acts as a fixed element by the operation of the first brake B1, thereby realizing the forward ninth speed and outputting a shifted torque to the output shaft OS connected with the third shaft TM3.

In the forward tenth speed shift-stage D10, the first clutch C1, and the first and second brakes B1 and B2 are simultaneously operated.

As a result, the first shaft TM1 is fixedly connected with the input shaft IS by the operation of the first clutch C1. In this state, torque of the Input shaft IS is input to the first shaft TM1.

In addition, the sixth shaft TM6 and the seventh shaft TM7 act as fixed elements by the operation of the first and second brakes B1 and B2 respectively, thereby realizing the forward tenth speed and outputting a shifted torque to the output shaft OS connected with the third shaft TM3.

In the reverse speed REV, the second and fourth clutches C2 and C4, and the first brake B1 are simultaneously operated.

As a result, the second shaft TM2 is fixedly connected with the input shaft IS by the operation of the second clutch C2, and the third shaft TM3 is fixedly connected with the seventh shaft TM7 by the operation of the fourth clutch C4. In this state, torque of the Input shaft IS is input to the second shaft TM2.

In addition, the sixth shaft TM6 acts as a fixed element by the operation of the first brake B1, thereby realizing the reverse speed and outputting a shifted torque to the output shaft OS connected with the third shaft TM3.

As described above, a planetary gear train according to an exemplary embodiment of the present disclosure may realize ten forward speeds and one reverse speed formed by operating four planetary gear sets PG1, PG2, PG3, and PG4 by controlling the four clutches C1, C2, C3, and C4 and the two brakes B1 and B2.

In addition, a planetary gear train according to an exemplary embodiment of the present disclosure may realize shift stages appropriate for rotational speed of an engine due to multi-stages of an automatic transmission and improve driving stability of a vehicle by utilizing a low rotational speed of an engine.

In addition, a planetary gear train according to an exemplary embodiment of the present disclosure may maximize engine driving efficiency by multi-stages of an automatic transmission, and may improve power delivery performance and fuel consumption.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, comprising:
    an input shaft for receiving an engine torque;
    an output shaft for outputting a torque;
    a first planetary gear set having first, second, and third rotational elements;
    a second planetary gear set having fourth, fifth, and sixth rotational elements;
    a third planetary gear set having seventh, eighth, and ninth rotational elements;
    a fourth planetary gear set having tenth, eleventh, and twelfth rotational elements;
    a first shaft fixedly connected with the sixth rotational element and selectively connected with the input shaft;
    a second shaft fixedly connected with the seventh rotational element and selectively connected with the input shaft;
    a third shaft fixedly connected with the eleventh rotational element and fixedly connected with the output shaft;
    a fourth shaft fixedly connected with the first rotational element, the eighth rotational element, and the twelfth rotational element;
    a fifth shaft fixedly connected with the third rotational element, the fourth rotational element, and the ninth rotational element; and
    an additional plurality of shafts, each of which is selectively connected to a transmission housing and fixedly connected to a rotation element of the first, second, and fourth planetary gear sets that is not fixedly connected with any of the first to fifth shafts.

2. The planetary gear train of claim 1, wherein:
    the plurality of shafts comprise:
    a sixth shaft fixedly connected with the second rotational element and the fifth rotational element, and selectively connected with the transmission housing; and
    a seventh shaft fixedly connected with the tenth rotational element, and selectively connected with the transmission housing,
    wherein the input shaft is selectively connected with the first shaft, the input shaft is selectively connected with the second shaft, the fifth shaft is selectively connected with the seventh shaft, and the third shaft is selectively connected with the fifth shaft.

3. The planetary gear train of claim 2, further comprising:
    four clutches each selectively connecting two shafts among the input shaft and the first to the seventh shaft; and
    two brakes selectively connecting the sixth shaft and the seventh shaft to the transmission housing, respectively.

4. The planetary gear train of claim 3, wherein:
    the four clutches further comprise a first clutch disposed between the input shaft and the first shaft;
a second clutch disposed between the input shaft and the second shaft;
a third clutch disposed between the fifth shaft and the seventh shaft; and
a fourth clutch disposed between the third shaft and the fifth shaft, and
the two brakes further comprise:
a first brake disposed between the transmission housing and the sixth shaft; and
a second brake disposed between the seventh shaft and the transmission housing.

5. The planetary gear train of claim 1, wherein:
    the first planetary gear set is a single pinion planetary gear set, and the first, second, and third rotational elements are, respectively, a first sun gear, a first planetary carrier, and a first ring gear;
    the second planetary gear set is a single pinion planetary gear set, and the fourth, fifth, and sixth rotational elements are, respectively, a second sun gear, a second planetary carrier, and a second ring gear;
    the third planetary gear set is a single pinion planetary gear set, and the seventh, eighth, and ninth rotational elements are, respectively, a third sun gear, a third planetary carrier, and a third ring gear; and
    the fourth planetary gear set is a single pinion planetary gear set, and the tenth, eleventh, and twelfth rotational elements are, respectively, a fourth sun gear, a fourth planetary carrier, and a fourth ring gear.

6. A planetary gear train of an automatic transmission for a vehicle, comprising:
    an input shaft for receiving an engine torque;
    an output shaft for outputting a torque;
    a first planetary gear set having first, second, and third rotational elements;
    a second planetary gear set having fourth, fifth, and sixth rotational elements;
    a third planetary gear set having seventh, eighth, and ninth rotational elements;
    a fourth planetary gear set having tenth, eleventh, and twelfth rotational elements;
    the first rotational element is fixedly connected with the eighth rotational element and the twelfth rotational element;
    the second rotational element is fixedly connected with the fifth rotational element, and selectively connected with the transmission housing;
    the third rotational element is selectively connected with the fourth rotational element and the ninth rotational element;
    the sixth rotational element is selectively connected with the input shaft;
    the seventh rotational element is selectively connected with the input shaft;
    the tenth rotational element is selectively connected with the ninth rotational element and a transmission housing, respectively; and
    the eleventh rotational element is selectively connected with the ninth rotational element, and fixedly connected with the output shaft.

7. The planetary gear train of claim 6, further comprising:
    four clutches each selectively connecting two rotational elements among the first to the twelfth rotational elements and the input shaft; and two brakes selectively connecting the fifth rotational element and the tenth rotational element to the transmission housing, respectively.

8. The planetary gear train of claim 7, wherein:
the four clutches include
a first clutch disposed between the input shaft and the sixth rotational element;
a second clutch disposed between the input shaft and the seventh rotational element;
a third clutch disposed between the ninth rotational element and the tenth rotational element; and
a fourth clutch disposed between the ninth rotational element and the eleventh rotational element; and
the two brakes include
a first brake disposed between the fifth rotational element and the transmission housing; and
a second brake disposed between the tenth rotational element and the transmission housing.

9. The planetary gear train of claim 6, wherein:
the first planetary gear set is a single pinion planetary gear set, and the first, second, and third rotational elements are, respectively, a first sun gear, a first planetary carrier, and a first ring gear,
the second planetary gear set is a single pinion planetary gear set, and the fourth, fifth, and sixth rotational elements are, respectively, a second sun gear, a second planetary carrier, and a second ring gear,
the third planetary gear set is a single pinion planetary gear set, and the seventh, eighth, and ninth rotational elements are, respectively, a third sun gear, a third planetary carrier, and a third ring gear, and
the fourth planetary gear set is a single pinion planetary gear set, and the tenth, eleventh, and twelfth rotational elements are, respectively, a fourth sun gear, a fourth planetary carrier, and a fourth ring gear.

* * * * *